(12) United States Patent
Keist et al.

(10) Patent No.: US 9,174,536 B2
(45) Date of Patent: Nov. 3, 2015

(54) FUNCTIONAL UNIT WITH BUTTON FUNCTIONS

(75) Inventors: Christoph Keist, Wattwil (CH); Swen Keiser, Dottikon (CH)

(73) Assignee: Abatek International AG, Bassersdorf (CH)

( * ) Notice: Subject to any disclaimer, the term of this patent is extended or adjusted under 35 U.S.C. 154(b) by 760 days.

(21) Appl. No.: 13/485,010

(22) Filed: May 31, 2012

(65) Prior Publication Data

US 2012/0306757 A1  Dec. 6, 2012

(30) Foreign Application Priority Data

Jun. 1, 2011 (CH) ....................... 0934/11

(51) Int. Cl.
| | |
|---|---|
| *G06F 3/02* | (2006.01) |
| *B29C 35/08* | (2006.01) |
| *B29C 45/14* | (2006.01) |
| *B60K 35/00* | (2006.01) |
| *B29C 45/00* | (2006.01) |
| *B29C 45/16* | (2006.01) |
| *B60K 37/06* | (2006.01) |
| *H01H 13/88* | (2006.01) |
| *B29L 31/34* | (2006.01) |

(52) U.S. Cl.
CPC ............ *B60K 35/00* (2013.01); *B29C 45/0053* (2013.01); *B29C 45/14688* (2013.01); *B29C 45/1671* (2013.01); *B60K 37/06* (2013.01); *G06F 3/02* (2013.01); *H01H 13/88* (2013.01); *B29K 2995/0026* (2013.01); *B29L 2031/3443* (2013.01); *B60K 2350/1028* (2013.01); *B60K 2350/1036* (2013.01); *G06F 2203/04103* (2013.01); *H01H 2229/002* (2013.01); *H01H 2229/034* (2013.01); *H01H 2229/046* (2013.01); *H01H 2229/047* (2013.01)

(58) Field of Classification Search
CPC ................... G06F 3/02; G06F 3/0202; G06F 2203/04103; B29C 45/0053–45/0062; B29C 45/14688–45/14754; B29C 45/1671; B29C 45/1673; B29C 2045/0056–2045/0079; H01H 13/83; H01H 13/88; H01H 13/705; H01H 2229/002; H01H 2229/034; H01H 2229/046; H01H 2229/047; B60K 37/00–37/06; B60K 2350/10–2350/1052; Y10T 29/49105; Y10T 29/49117; Y10T 29/49135; Y10T 29/49155; Y10T 29/49156; Y10T 29/1998
USPC .................. 200/333; 264/129, 134, 251, 400; 345/157, 160, 161, 173, 174
See application file for complete search history.

(56) References Cited

U.S. PATENT DOCUMENTS

| | | | |
|---|---|---|---|
| 2008/0223702 A1 | 9/2008 | Hsu | |
| 2010/0080970 A1* | 4/2010 | Hayes et al. | ................ 264/255 |
| 2010/0310814 A1 | 12/2010 | Thielcke et al. | |

FOREIGN PATENT DOCUMENTS

| | | |
|---|---|---|
| DE | 102004013819 A1 | 10/2005 |
| DE | 202005012021 U1 | 12/2005 |
| EP | 2269795 A1 | 1/2011 |

*Primary Examiner* — Nathan Danielsen
(74) *Attorney, Agent, or Firm* — The Webb Law Firm

(57) ABSTRACT

The invention relates to a method of producing a multifunctional functional unit with a rigid support structure, in which control elements and/or display elements are arranged behind a transparent surface layer which is continuous over substantially the entire functional unit. The method includes punching a positioning hole in a transparent plastic film with a thickness in the range of 0.1-0.4 mm; positioning the film into an injection mold using the positioning hole, with a corresponding positioning means for engaging in the positioning hole; back-injecting film to form a plastics support on the first side, the injection mold being designed such that, of the plastic film is not back-injected at the control elements and/or display elements, on the second side the plastics film is flooded with a transparent curing casting compound to form a continuous transparent surface layer.

24 Claims, 2 Drawing Sheets

FUNCTIONAL UNIT WITH BUTTON FUNCTIONS

FIELD OF THE INVENTION

The present invention relates to a method of producing a multifunctional functional unit, for example a console structure for a vehicle or a device, with a rigid support structure, in which operating elements and/or display elements are arranged behind a transparent surface layer which is continuous over substantially the entire functional unit. The invention relates, moreover, to functional units produced in this way.

BACKGROUND OF THE INVENTION

These days, control elements and display devices as well as buttons of all types are incorporated in automobile interiors in recesses in a large panel. This results in gaps and material transitions.

Currently known solutions may be summarized as follows:

Membrane keyboards with embossing or coating application: membrane keyboards meet the requirements of a continuous surface and, through embossing or selective coating or silicone application, of formed-on button geometries, are however always restricted to a flat basic geometry. See for example DE 20 2005 012 021 U1.

Thermoformed film: as a result of thermoforming, films may be transformed into a three-dimensional shape and button geometries may also be formed. Limitations result from the required bending radii (sharp edges are impossible) and the minimum spacing of the buttons (there must be sufficient material for thermoforming between the buttons). Functional actuation of such a button is also not simple to achieve, since the deformed film also has to effect the button stroke. Such films also have a great tendency to fail quickly during an actuation endurance test.

Silicone surface: freely shaped functional operator interfaces may be made from silicone. This solution is distinguished by a soft surface and limited brilliance of the silicone colours. It is for this reason that this solution is often not selected precisely for large-area applications.

SUMMARY OF THE INVENTION

The aim of this invention is, inter alia, to produce a continuous three-dimensionally shaped panel with integral control and/or display elements from plastics with a high quality appearance. In this respect, the control elements/buttons preferably exhibit tactile feedback, which is of vital importance for operating reliability.

The present invention accordingly firstly relates to a method according to claim 1 and to a correspondingly produced multifunctional functional unit.

The invention specifically relates on the one hand to a method of producing a multifunctional functional unit with a rigid unit structure, in which control elements and/or display elements are arranged behind a transparent surface layer which is continuous over substantially the entire functional unit. The method is characterized in this respect in particular in that at least the following steps are performed:
i) a flat, flexible and at least in places transparent plastics film with a thickness in the range of 0.05-0.4 or 0.1-0.4 mm is initially introduced and into this is preferably introduced or applied a means for positioning it in an injection mould, for example in the form of at least one positioning hole, which is punched into the plastics film;
ii) the flat plastics film is introduced in a precisely positioned manner, for example using the at least one positioning hole (a plurality of such holes is also possible), into an injection mould provided with a corresponding positioning means, for example in the form of an element for engaging in the at least one positioning hole but it may also take the form of a clamping device for the film, and the plastics film is back injected, to form a substantially continuous hard plastics support on the first side, the injection mould being designed such that, in the region of the control elements and/or display elements, the plastics film is not back-injected at least in places and remains bare in the form of at least two recesses;
iii) on the second side remote from the first side, the plastics film is flooded in the same injection mould or, after transfer of the blank into a further injection mould, in this further injection mould, substantially all over with a transparent curing (self-curing, curing in the presence of separate curing agent, and/or hot-curing) casting compound in an RIM (reaction injection moulding) method and is coated to form a continuous transparent surface layer with a thickness of at least 0.1 mm over substantially the entire functional unit, membrane regions which are flexible at least in places being formed in the region of the recesses (in this respect it is also possible for the mould to be closed somewhat further after injection of the casting compound such that a very thin layer of casting compound is possible);
iv) control elements and/or display elements are inserted into the recesses and joined to the plastics support.

A first preferred embodiment of this method is characterized in that the plastics film is printed and/or decorated before, during or after step i), preferably on the first and/or the second side, preferably using a screen printing method, a laser printing method, a stamp printing method, a spray printing method, an offset printing method or a digital printing method.

Alternatively or in addition, it is possible according to a further preferred embodiment to print the blank at least in places after step ii), preferably using one of the above-stated methods, and/or to decorate it. It is alternatively possible to subject the blank to laser marking. Marking in this phase of the production method is particularly advantageous if it cannot be ensured in the context of back injection that the film position is arranged completely accurately over the future positions of the switching elements/display elements.

A further preferred embodiment is characterized in that the plastics film is converted at least in places by step ii) into a three-dimensional surface shape and stabilized in said shape. In other words, in the context of step ii), the film may either remain in its flat position, or it may also be transformed into a three-dimensional surface shape either by being introduced into the injection mould in a correspondingly shaped manner or by the actual process of back injection.

The control element is preferably at least one switch with tactile feedback.

A further preferred embodiment is characterized in that the display element is an LCD display, preferably a (resistive or capacitive) touch-sensitive display.

A further preferred embodiment is characterized in that the functional element comprises both at least one control element in the form of a switch with tactile feedback and at least one display element, preferably a resistive or capacitive touch-sensitive display element.

A further preferred embodiment is characterized in that the plastics film is a plastics film of TPU (thermoplastic polyurethane elastomers) or of polyamide, preferably of polyamide 6 or polyamide 12.

A further preferred embodiment is characterized in that the casting compound for forming the surface layer is a transparent polyurethane resin which cures in the presence of a curing agent or is self-curing and/or hot-curing, said resin having a thickness at least in the region of the control elements and the membrane regions arranged at least in part therearound of no more than 0.4 mm, and the surface layer preferably having a thickness in these regions of at least 0.2 mm.

The present invention additionally also relates to a multifunctional functional unit with at least one control element and preferably at least one display element, characterized by a plastics film of a thickness in the range of 0.05-0.4 or 0.1-0.4 mm directly back-injected on a first side with a hard plastics support which is continuous apart from at least two recesses, which film comprises on the second, opposite side, a direct, substantially continuous transparent surface layer of a cured casting compound. In this case, at least one control element in the form of a switch, preferably with tactile feedback, is arranged in at least one of the recesses, around which element there is arranged an at least partially circumferential flexible membrane region for allowing the button stroke, in which region the flexible multilayer structure consists only of optionally printed plastics film and surface layer.

A first preferred embodiment of such a functional element is characterized in that it is produced using a method as described above.

A further preferred embodiment of the functional unit is characterized in that it additionally comprises at least one display element, and in that the at least one control element and the at least one display element are preferably fixed to a common printed circuit board, which is in particular preferably fixed to the hard plastics support. In this case, preferably all the control elements and display elements of the entire functional unit are arranged on a single common printed circuit board.

According to a further preferred embodiment, regions which protrude at least in part above the surface of the casting compound are formed on the surface, in particular in the regions of the control elements. In the stated membrane regions, the above-stated thicknesses of the surface layer remain, however, in order to ensure sufficient mobility for tactile feedback of the switches.

The hard plastics support and/or the printed circuit board on which control elements and/or display elements are arranged may comprise light guides, light sources, and/or light shields.

Such a functional unit may be an integral console element or part of a console element for a vehicle, a steering wheel for a vehicle, a medical device, a computer mouse, a games console or an operator interface for a mobile telephone or desk telephone.

Further embodiments are indicated in the dependent claims.

BRIEF DESCRIPTION OF THE DRAWINGS

Preferred embodiments of the invention are described hereinafter with reference to the drawings, which merely serve for the purpose of explanation and should not be interpreted as limiting. In the drawings.

DESCRIPTION OF PREFERRED EMBODIMENTS

Figure 1:
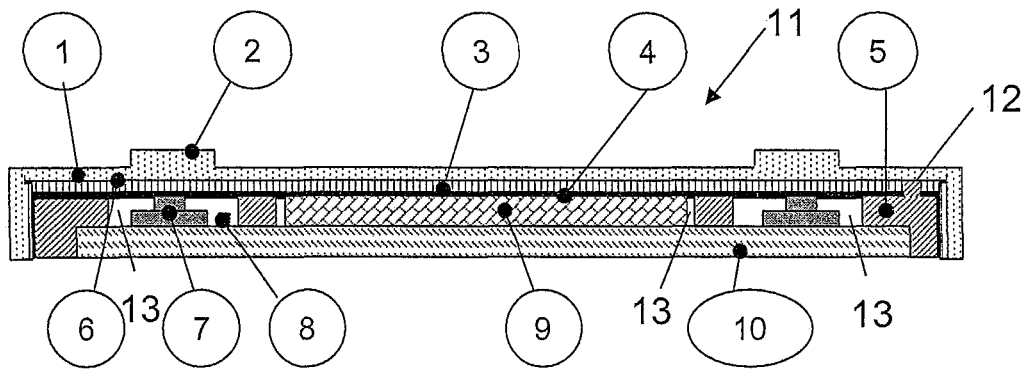
FIG. 1 shows a schematic section through a functional unit according to the invention, for example along line A-A of a design according to FIG. 3.
Figure 2:
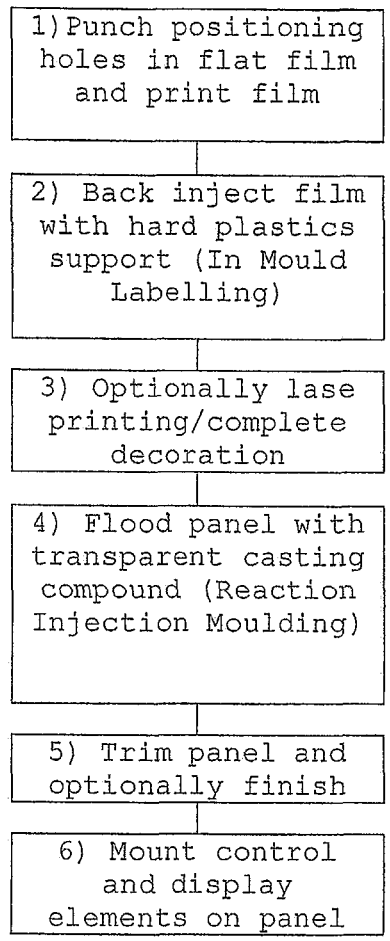
FIG. 2 is a representation of the individual method steps of the proposed method.
Figure 3:
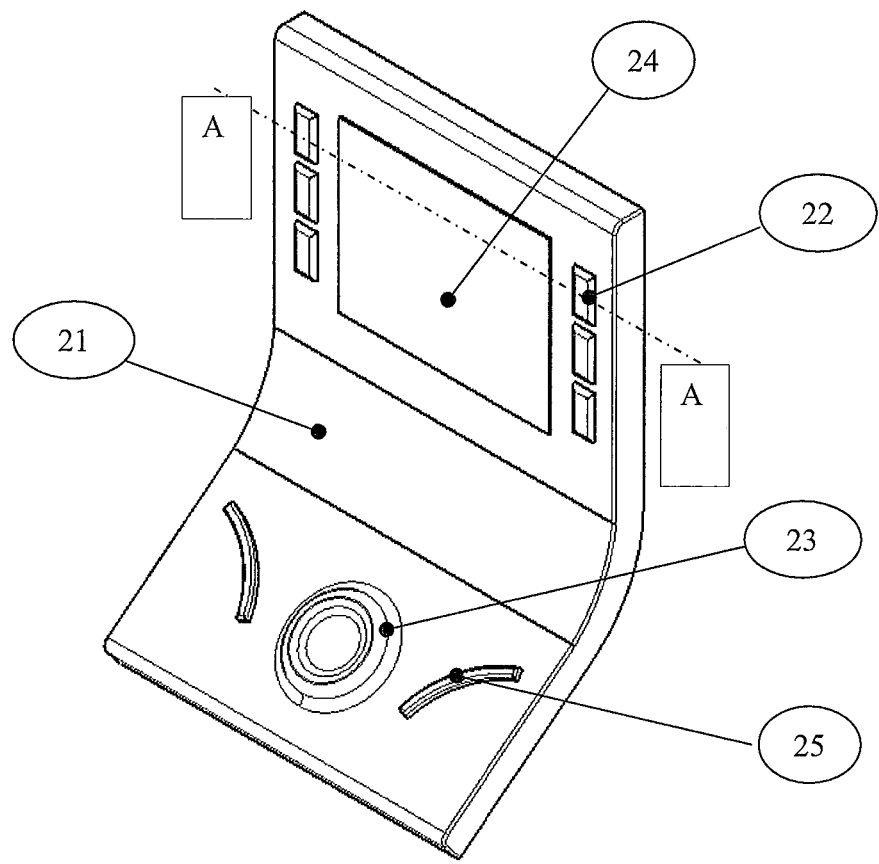
FIG. 3 shows an example of a panel of an automobile centre console.

FIG. 3 shows an example of a panel of an automobile centre console, FIG. 1 shows a schematic section through such a functional unit according to the invention along line A-A of a design according to FIG. 3, and FIG. 2 is a representation of the individual method steps of the proposed method. The individual steps of this method will now be explained as follows:

Step 1 of FIG. 2: peripheral positioning holes 12 are punched into a soft film 3 (for example 200 μm thick TPU). Said punching is not absolutely necessary in this case; the film may also for example be stretched out in the injection mould for precise positioning. The film 3 is then printed and decorated on the front and/or back. In the sectional representation according to FIG. 1, a positioning hole 12 remains even in the finished component 11, at a point where it is not problematic for example for this hole 12 to then be filled with the hard material of the region 5, or the region is backed in the mould in such a way that the hole 12 is not filled with material of the hard support 5 but is then filled with casting compound in the context of step 4 in FIG. 2. However, such positioning aids are frequently arranged specifically at the edge of the film 3, in such a manner that the positioning hole 12 or the positioning holes 12 are then removed as part of the finishing process (step 5 according to FIG. 2) and are no longer present in the finished component.

In the context of step 2 of FIG. 2, the film 3 is then inserted into the injection mould at the positioning holes and a hard plastics support 5 is back-injected. The material of this plastics support 5 may be polyamide, polycarbonate or indeed ABS. In the regions of the control and display elements, the film 3 is not back-injected, i.e. recesses 13 remain therefor, and the layered structure of film 3 and surface layer 2 there form a flexible and resilient skin in the manner of a membrane 6.

The film 3 on the plastics support 5 may then be decorated again (or for the first time) in the context of step 3 of FIG. 2, for example symbols may be lased accurately out of the printing or other elements may be printed on, for example using the pad printing method.

In a subsequent step, according to number four of FIG. 2, the plastics support 5 with film 3 is positioned in a mould and the mould is closed, a gap of at least 0.1 mm remaining between film top and mould. This gap is typically filled with a reactive PU casting compound under high pressure (low pressure method also possible), i.e. in a PU high pressure system with clear, i.e. substantially transparent or at least translucent, polyurethane. Once the polyurethane is cured (heat input is additionally possible), the panel is preferably additionally finished, e.g. trimmed (peripheral film and sprue etc.) and optionally also polished. Control 7 and display elements 9 may then be fitted from behind, this preferably taking place in such a way that a printed circuit board 10 with elements 7 and 9 mounted thereon is inserted from behind and attached to the structure 5.

Transparent casting compound 1 with formed-on raised button elements 2 or decorative elements: the casting compound for producing the surface layer 1 is the most important material of this invention. It serves on the one hand to generate substantially any desired three-dimensional surface texture (negative image of the mould surface). On the other hand, substantially any desired structures, such as button shapes or decorative webs etc., may be mounted on the surface with the casting compound. This typically takes place within a minimum thickness at the thinnest point of 0.1-2.0 mm. This surface layer 1 may be continuous over the entire surface or indeed only in sub-regions. The surface layer 1 has the following properties:

- resilient, to allow actuation of buttons 2/7 in the thin membrane region 6;
- firm in the thick button region 2 to provide a hard feel;
- transparent in the context of the applied thickness, to make decoration visible;
- good adhesion to film;
- good abrasion resistance;
- high scratch resistance;
- no yellowing, even on exposure to strong sunlight;
- odour-neutral and emissions-free.

In the membrane region 6 of the buttons, the casting compound normally has a thickness of 0.1 mm to 0.3 mm, in order to allow actuation of the button with tactile feedback. In the other areas, the surface feels hard due to the hard back-injected plastics 5, the hard underlying display elements 9, or the thick button regions 2.

The hardness of the casting compound may be adjusted by the mixing ratio of curing agent to coating material. It is normally preferable for the hardness to be in the range of Shore A 70-100, or in the range of Shore D 80-100, preferably Shore D 80-85, particularly preferably in the region of Shore A 80.

In the button region, this membrane 6 allows tactile feedback of the buttons 7, and this in the case of a 3-dimensional surface 1 which is continuous over the entire component. Polyurethane has proven to be a highly suitable casting compound material. The polyurethane is applied to the panel by means of high- or low-pressure Reaction Injection Moulding (RIM), an intimate bond automatically being formed between the plastics film 3 and the surface layer 2. There are 3 possible procedures in this respect:

1. flooding with casting compound directly after back injection on the same machine in a second mould, the advantage being that the panel is already perfectly positioned.
2. inserting the panel into an RIM mould as a separate step, in which mould the gap for the surface coating and the buttons, decorative webs etc. is flooded with polyurethane to form the surface layer 1/2. The minimum film thickness for filling the mould is 200 μm.
3. as per 2, but after the mould has been filled the film thickness is reduced still further to 100 μm (0.1 mm) by means of embossing.

A mould release agent may be advantageous.

After flooding, the panel is preferably finished, for example trimmed (film and sprue). The transparent casting compound may if need be also have to be second-polished.

Plastics film 3: the film should exhibit the following properties:

- deformable and back-injectable;
- flexible and soft, to ensure button function (stroke);
- printable for decorative purposes;
- transparent for backlighting and display elements/display zones;
- good (durable) adhesion to surface layer;
- good (durable) adhesion to the hard support structure.

The film 3 preferably consists of a 50-300 μm thick TPU film. The TPU may in this case be aliphatic or non-aliphatic. 200 μm is a preferred thickness.

The hardness of the film 3 is preferably similar to that of the casting compound, being in the range of Shore A 70-100, or Shore D 80-100, preferably Shore D 80-85, and particularly preferably in the region of Shore A 80.

To achieve better adhesion relative to the back-injected element 5, the film 3 may be cleaned with alcohol, pretreated by plasma, corona or flame or contain a co-extruded olefin layer.

Alternatively, other materials are also feasible, such as polyamide PA or TPE etc.

Decoration 4: the film 3 may be printed on the front or back (for example screen printing). Symbols may already have been applied to the film. However, during back injection of the soft film 3, the symbols and their position may be uncontrollably distorted, such that the following procedure is preferred:

1. printing the front of the film with symbol colours (for example white);
2. printing the film with surface colour (for example black);
3. back injecting the printed film;
4. lasing the symbols on the back-injected component, so ensuring that geometry and position match.

The procedure may also be applied with back-printed film 3, but then printing is only performed with surface colour and the symbols are lased from behind and if necessary then additionally filled with symbol colour by pad printing.

Hard plastics support 5: the support 5 must perform the following functions:

1. firm basis for film 3, in order to produce a maximally hard and firm surface in the regions without buttons;
2. good adhesion to film 3;
3. open windows in the region of the flexible membrane 6;
4. open windows in the region of the display elements/displays 9 unless a transparent material is used or a two-component method with a transparent component;
5. fastening options for control and display components or a printed circuit board 10 with these elements on the back;
6. fastening options for integrating the panel into the vehicle/device.

ABS/PC plastics material is preferably used for back injecting the TPU film 3, but PA6 or ABS/PA or similar systems may also be used.

Wall thickness is substantially dependent on component size and installation depth.

Flexible membrane region without plastics back injection 6: in order to allow tactile feedback in the case of the control elements 7 or to actuate a resistive display 9, a membrane 6 is needed. This membrane 6 consists only of the decorated film 3 and the casting compound of the surface layer 1. The thickness of the membrane 6 results from the thickness of the film 3 and the thickness of the casting compound of the surface layer 1 in the membrane region. This overall thickness should not exceed 600 μm, because beyond that no sharp tactile switching feel is usually possible.

In this membrane region 6, the film 3 is not back-injected (window/recess).

The length of the membrane (distance between edge of formed-on button 2 and back injection 5) should be in the range of 2-10 mm, preferably in the range of 4-6 mm, typically approx. 5 mm, but is dependent on button geometry and the switching feel to be achieved.

Microswitch/snap domes 7: to achieve tactile feedback on button actuation, a microswitch 7 or a snap dome is mounted under the button 2. Actuating force and snap may be influenced by the choice of snap dome.

It is one of the very great advantages and unique selling points of this invention that a tactile button feeling may be achieved in a continuous panel surface. However, resistive (silicone switching mat instead of microswitch) and capacitive buttons may also be produced or a combination of these technologies.

Backlighting 8: backlighting of the buttons or illumination of individual regions or functional illumination may be achieved using normal LEDs and or optical fibres. It is however also possible to use an optical lighting film or EL films.

Display elements/displays 9: displays may be attached to the plastics support. It is also possible, thanks to the thin and flexible layer 1/3 over the display 9, to use resistive touch screens or indeed capacitive touch screens.

Printed circuit board 10: the printed circuit board serves as a receptacle for the control 7 and display elements 9. A rigid, flexible or a rigid-flex printed circuit board 10 may be used for this purpose. In the case of extreme surface curvatures, 3D-MID technology and the like are also possible.

The printed circuit board 10 may be attached directly to the panel by means of screws, adhesive bonding, or snap-on connections on the plastics back-injected element.

General Advantages of an Optional Component According to the Invention:

A three-dimensionally curved panel is provided, with
continuous surface without gaps
high-quality, neat appearance
integral control and display elements
buttons with tactile feedback
resistive and capacitive touch displays possible
capacitive elements over printed electronics possible
buttons and decorative elements in almost any desired shape
plurality of possible surface textures (matt/gloss)
flat structure
reduced component count Applications (Examples):
centre console for cars with integral buttons and displays
steering wheel with integral buttons
door panel with integral buttons
medical devices
computer mouse
games consoles
keypad of any type, e.g. for mobile telephones and desk telephones
hand-held devices of any type
covers for domestic appliances The invention accordingly relates to a panel consisting of a back-injected film which is coated on the top at least in part, preferably all over, with a clear casting compound. Control and display elements are integrated into this panel. In addition, the surface layer additionally comprises formed-on structures. The control elements comprise buttons with tactile feedback. The display elements may comprise resistive or capacitive touch displays. The panel comprises a back-injected and decorated soft TPU film, which is flooded with polyurethane in the RIM method. Snap domes or contact pills are provided on the underside of the buttons, these producing a button feel and electrical contact. The support comprises a recess surrounding the button geometry, so as to allow the button stroke. A microswitch or other contact technology may be used on the underside of the buttons. The support may comprise light guides or light shields, to provide functional illumination. The surface layer may be applied substantially in any desired thickness, shape and structure; it may be provided as a continuous surface or only in individual regions, but then at least in the region of the functional elements, covering these completely without gaps. Typically, the entire surface is provided with a transparent surface layer in the manner of a protective layer, for example to increase scratch resistance. A lens structure may be introduced into the surface, to achieve optical lens effects. The casting compound may here also not cure reactively, but rather by means of heat or other external energy sources.

LIST OF REFERENCE NUMERALS 1 continuous transparent casting compound over entire panel, flexible in thin regions
2 formed-on button of transparent casting compound
3 flexible film, transparent at least in places
4 printing/decorative layer applied to film
5 hard plastics support back-injected onto film, support structure
6 flexible membrane region without plastics back injection
7 microswitch/snap dome for button function
8 LED for backlighting
9 display element/display
10 printed circuit board
11 functional unit
12 positioning hole
13 recess in 5
21 surface flooded with transparent casting compound
22 formed-on button structures of transparent casting compound; buttons with tactile feedback on actuation.
23 formed-on joystick structure of transparent casting compound
24 display elements/display behind transparent casting compound, for example touch displays
25 decorative elements of transparent casting compound

The invention claimed is:

1. A method of producing a multifunctional functional unit with a rigid support structure, in which control elements and/or display elements are arranged behind a transparent surface layer which is continuous over substantially the entire functional unit, the method comprising:
   i) punching at least one positioning hole in a flat, flexible and at least in places transparent plastics film with a thickness in the range from 0.05-0.4 mm;
   ii) introducing the flat plastics film in a precisely positioned manner, using the at least one positioning hole, into an injection mould provided with a corresponding positioning means, for engaging in the positioning hole, and back-injecting the plastics film to form a substantially continuous hard plastics support on the first side, the injection mould being designed such that, in the region of the control elements and/or display elements, the plastics film is not back-injected at least in places and remains bare in the form of at least two recesses;
   iii) on the second side remote from the first side, flooding the plastics film in the same injection mould or, after transfer of the blank into a further injection mould, in this further injection mould, substantially all over with a transparent curing casting compound in a reaction injection moulding (RIM) method and coating over substantially the entire functional unit to form a continuous transparent surface layer with a thickness of at least 0.1 mm membrane regions which are flexible at least in places being formed in the region of the recesses; and
   iv) inserting control elements and/or display elements into the recesses and joined to the plastics support.

2. The method according to claim 1, wherein further comprising: printing and/or decorating the plastics film before or after step i).

3. The method according to claim 1, further comprising: converting the plastics film at least in places by step ii) into a three-dimensional surface shape and stabilized in said shape.

4. The method according to claim 1, wherein the control element is a switch with tactile feedback.

5. The method according to claim 1, wherein the display element is an LCD display.

6. The method according to claim 1, wherein the functional unit comprises both at least one control element in the form of a switch with tactile feedback and at least one display element.

7. The method according to claim 1, wherein the plastics film is a plastics film of thermoplastic polyurethane elastomer or of polyamide.

8. The method according to claim 7, wherein the plastics film is a plastics film of polyamide 6 or polyamide 12.

9. The method according to claim 1, wherein the casting compound for forming the surface layer is a transparent polyurethane resin which cures in the presence of a curing agent or is self-curing and/or hot-curing, said resin having a thickness at least in the region of the control elements and the membrane regions arranged at least in part therearound of no more than 0.4 mm.

10. The method according to claim 1, wherein after step ii) the blank is printed at least in places and/or decorated and/or subjected to laser marking.

11. The method according to claim 1, wherein the plastics film is printed and/or decorated before or after step i), on the first and/or the second side, using a screen printing method, a laser printing method, a stamp printing method, a spray printing method, an offset printing method, or a digital printing method.

12. The method according to claim 1, wherein the display element is an LCD display.

13. The method according to claim 12, wherein the LCD display element is a touch-sensitive display.

14. The method according to claim 1, wherein the functional unit comprises both at least one control element in the form of a switch with tactile feedback and at least one display element.

15. The method according to claim 14, wherein the at least one display element comprises a resistive or capacitive touch-sensitive display element.

16. The method according to claim 1, wherein the casting compound for forming the surface layer is a transparent polyurethane resin which cures in the presence of a curing agent or is self-curing and/or hot-curing, said resin having a thickness at least in the region of the control elements and the membrane regions arranged at least in part therearound of no more than 0.4 mm, and the surface layer having a thickness in these regions of at least 0.1 mm or at least 0.2 mm.

17. The method according to claim 1, wherein after step ii) the blank is printed at least in places and/or decorated and/or subjected to laser marking.

18. A multifunctional functional unit with at least one control element and at least one display element, wherein a plastics film of a thickness in the range of 0.05-0.4 mm is directly back-injected on a first side with a hard plastics support which is continuous apart from at least two recesses, which film comprises on a second, opposite side, a direct, substantially continuous transparent surface layer of a cured casting compound, wherein at least one control element in the form of a switch with tactile feedback is arranged in at least one of the recesses, around which element there is arranged an at least partially circumferential flexible membrane region for allowing a button stroke, in which region the flexible membrane region consists only of an optionally printed plastics film and surface layer.

19. The functional unit according to claim 18, wherein the functional unit is produced using a method comprising:
  i) punching at least one positioning hole in a flat, flexible and at least in places transparent plastics film with a thickness in the range from 0.05-0.4 mm;
  ii) introducing the flat plastics film in a precisely positioned manner, using the at least one positioning hole, into an injection mould provided with a corresponding positioning means, for engaging in the positioning hole, and back-injecting the plastics film to form a substantially continuous hard plastics support on the first side, the injection mould being designed such that, in the region of the control elements and/or display elements, the plastics film is not back-injected at least in places and remains bare in the form of at least two recesses;
  iii) on the second side remote from the first side, flooding the plastics film the same injection mould or, after transfer of the blank into a further injection mould, in this further injection mould, substantially all over with a transparent curing casting compound in a reaction injection moulding (RIM) method and coating over substantially the entire functional unit to form a continuous transparent surface layer with a thickness of at least 0.1 mm membrane regions which are flexible at least in places being formed in the region of the recesses; and
  iv) inserting control elements and/or display elements into the recesses and joined to the plastics support.

20. The functional unit according to claim 18, wherein the functional unit comprises at least one display element, and wherein the at least one control element and the at least one display element are fixed to a common printed circuit board, which is fixed to the hard plastics support, and wherein all the control elements and display elements of the entire functional unit are arranged on a single common printed circuit board.

21. The functional unit according to claim 18, wherein regions which protrude at least in part above the surface of the casting compound are formed on the surface.

22. The functional unit according to claim 18, wherein the hard plastics support and/or a printed circuit board on which control elements and/or display elements are arranged comprises light guides, light sources, and/or light shields.

23. The functional unit according to claim 18, wherein the functional unit is a console element for a vehicle, a steering wheel for a vehicle, a medical device, a computer mouse, a games console, or an operator interface for a mobile telephone, or desk telephone.

24. The functional unit according to claim 18, wherein regions which protrude at least in part above the surface of the casting compound are formed on the surface, in the regions of the control elements.

* * * * *